(12) United States Patent
Wang

(10) Patent No.: US 9,151,980 B2
(45) Date of Patent: Oct. 6, 2015

(54) METHOD FOR MANUFACTURING LIQUID CRYSTAL PANEL

(75) Inventor: Jun Wang, Shenzhen (CN)

(73) Assignee: SHENZHEN CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 623 days.

(21) Appl. No.: 13/512,590

(22) PCT Filed: May 2, 2012

(86) PCT No.: PCT/CN2012/074988
§ 371 (c)(1),
(2), (4) Date: May 29, 2012

(87) PCT Pub. No.: WO2013/159369
PCT Pub. Date: Oct. 31, 2013

(65) Prior Publication Data
US 2013/0288410 A1    Oct. 31, 2013

(30) Foreign Application Priority Data
Apr. 25, 2012 (CN) .......................... 2012 1 0124154

(51) Int. Cl.
*H01L 33/08* (2010.01)
*G02F 1/1335* (2006.01)
*G02F 1/13* (2006.01)

(52) U.S. Cl.
CPC .. *G02F 1/133514* (2013.01); *G02F 2001/1316* (2013.01)

(58) Field of Classification Search
None
See application file for complete search history.

(56) References Cited

U.S. PATENT DOCUMENTS

2005/0157246 A1    7/2005  Motomatsu
2009/0014028 A1    1/2009  Hirota et al.

FOREIGN PATENT DOCUMENTS

| CN | 1575870 A | 2/2005 |
|---|---|---|
| CN | 1645194 A | 7/2005 |
| CN | 101345189 A | 1/2009 |
| CN | 101605615 A | 12/2009 |
| CN | 202087088 U | 12/2011 |
| JP | 2005131602 A | 5/2005 |

*Primary Examiner* — Seahvosh Nikmanesh

(57) ABSTRACT

The present invention relates to a method for manufacturing a liquid crystal panel, which comprises steps of: forming a plurality of array thin films on a first glass substrate in turn to form an array substrate; cleaning the array substrate by ultrasound to eliminate bubbles and dirt between the array thin films. The present invention can change surface properties of each thin film of the array substrate for tightening the combination between the thin films and efficiently decreasing or minimizing bubbles and dirt between the thin films of the liquid crystal panel.

14 Claims, 4 Drawing Sheets

METHOD FOR MANUFACTURING LIQUID CRYSTAL PANEL

FIELD OF THE INVENTION

The present invention refers to the field of the liquid crystal display, in particular to a method for manufacturing a liquid crystal panel for decreasing or minimizing bubbles and dirt between thin films of the liquid crystal panel.

BACKGROUND OF THE INVENTION

Among flat panel display devices, the thin film transistor liquid crystal display (TFT-LCD) has many advantages such as small volume, low power consumption, relative lower manufacturing cost and non-radiation, so as to play a leading role in the current market of panel display devices. A liquid crystal panel of TFT-LCD is generally formed by attaching an array substrate (TFT substrate) and a color filter substrate (CF substrate) to each other. Traditionally, the array substrate is generally processed by process of five photolithographies (five masks) or four photolithographies (four masks), and wherein each of the photolithographies requires to execute steps of cleaning, drying, film-forming and etching. Meanwhile, the CF substrate also requires several processes of photolithographies to finish. Each of the photolithographies needs to deposit at least one thin film, so that the TFT substrate and the CF substrate each has a plurality of thin films. As shown in FIG. 1, a TFT substrate comprises several array thin films, such as a source layer 101, a gate layer 102, a drain layer 103, an active layer 104, an insulating layer 105 and a first electrode layer 106. As shown in FIG. 2, a CF substrate comprise several CF thin films, such as a black matrix layer 201, a RGB (red-green-blue) layer 202 and a second electrode layer 203.

During the mentioned-above process of photolithographies, it is easy to form bubbles and dirt in each space between the thin films (the array thin films or the CF thin films) deposited on the TFT substrate or the CF substrate, so that it causes the disadvantage of partially different display contract within a display region of the display panel, resulting in affecting the display quality of the display panel.

Therefore, it is necessary to provide a method for manufacturing a liquid crystal panel to solve the problems of the traditional technology.

SUMMARY OF THE INVENTION

The purpose of the present invention is to provide a method for manufacturing a liquid crystal panel, which can change surface properties of each of thin films on substrates of the liquid crystal panel, in order to tighten the combination between the thin films and to efficiently decrease or minimize bubbles and dirt between the thin films of the liquid crystal panel, for solving the technical problem that bubbles and dirt are easily formed between thin films on the substrates in the traditional method for manufacturing a liquid crystal panel.

To solve the problems mentioned above, the present invention provides technical solutions, as follows:

The present invent relates to a method for manufacturing a liquid crystal panel, which comprises steps of: (A) forming a plurality of array thin films on a first glass substrate in turn to form an array substrate; and (B) cleaning the array substrate by ultrasound to eliminate bubbles and dirt between the array thin films; after the steps (A) and (B), the method for manufacturing a liquid crystal panel further comprises steps of: (A1) forming a plurality of color filter (CF) thin films on a second glass substrate in turn to form a CF substrate; and (B1) cleaning the CF substrate by ultrasound to eliminate bubbles and dirt between the color filter thin films; after the step (B1), the method for manufacturing a liquid crystal panel further comprises a step of: (C) attaching the ultrasound-cleaned array substrate to the corresponding CF substrate, so as to form a liquid crystal cell.

The present invention further relates to a method for manufacturing a liquid crystal panel, comprising steps of: (A) forming a plurality of array thin films on a first glass substrate in turn to form an array substrate; and (B) cleaning the array substrate by ultrasound to eliminate bubbles and dirt between the array thin films.

In the method for manufacturing a liquid crystal panel of the present invention, the array thin films comprise a source layer, a gate layer, a drain layer, an insulating layer and a first electrode layer.

In the method for manufacturing a liquid crystal panel of the present invention, during the steps (A) and (B), further comprising steps of: (A1) forming a plurality of color filter thin films on a second glass substrate in turn to form a CF substrate; and (B1) cleaning the CF substrate by ultrasound to eliminate bubbles and dirt between the color filter thin films.

In the method for manufacturing a liquid crystal panel of the present invention, before the steps (A) and (B), the method for manufacturing a liquid crystal panel further comprises steps of: (A1) forming a plurality of color filter thin films on a second glass substrate in turn to form a CF substrate; and (B1) cleaning the CF substrate by ultrasound to eliminate bubbles and dirt between the color filter thin layers.

In the method for manufacturing a liquid crystal panel of the present invention, after the steps (A) and (B), the method for manufacturing a liquid crystal panel further comprises steps of: (A1) forming a plurality of color filter thin films on a second glass substrate in turn to form a CF substrate; and (B1) cleaning the CF substrate by ultrasound to eliminate bubbles and dirt between the color filter thin films.

In the method for manufacturing a liquid crystal panel of the present invention, the CF thin films comprise a black matrix layer, a RGB layer and a second electrode layer.

In the method for manufacturing a liquid crystal panel of the present invention, wherein after the step B, it further comprises a step of: (C) attaching the ultrasound-cleaned array substrate to the corresponding CF substrate, so as to form a liquid crystal cell.

In the method for manufacturing a liquid crystal panel of the present invention, the frequency of ultrasound is ranged from 20000 Hz to 1000000 Hz; the ultrasound power is ranged from 0.1 watt/mm$^2$ to 20 watt/mm$^2$; the period of ultrasound is ranged from 20 seconds to 240 seconds.

The present invention further relates to a method for manufacturing a liquid crystal panel, wherein it comprises steps of: (A2) forming a plurality of color filter thin films on a second glass substrate in turn to form a CF substrate; and (B2) cleaning the CF substrate by ultrasound to eliminate bubbles and dirt between the color filter thin films.

In the method for manufacturing a liquid crystal panel of the present invention, the CF thin films comprise a black matrix layer, a RGB layer and a second electrode layer.

In the method for manufacturing a liquid crystal panel of the present invention, after the step (B), it further comprises a step of: (C2) attaching the ultrasound-cleaned CF substrate to the corresponding array substrate, so as to form a liquid crystal cell.

In the method for manufacturing a liquid crystal panel of the present invention, the frequency of ultrasound is ranged from 20000 Hz to 1000000 Hz; the ultrasound power is ranged from 0.1 watt/mm² to 20 watt/mm²; the period of ultrasound is ranged from 20 seconds to 240 seconds.

The method for manufacturing a liquid crystal panel in the present invention has following benefits: it can change surface properties of each of thin films on substrates of the liquid crystal panel to tighten the combination between the thin films more compact and to decrease or minimize bubbles and dirt between thin films of the liquid crystal panel, to solve the technical problem that bubbles and dirt are easily formed between the thin films on the substrates in the traditional method for manufacturing a liquid crystal panel.

For the present invention described above will be more apparent, the following specific preferable embodiment with the companying drawings will be elaborated as follows:

DETAILED DESCRIPTION OF THE PREFERRED EMBODIMENTS

The structure and the technical means adopted by the present invention to achieve the above and other objects can be best understood by referring to the following detailed description of the preferred embodiments and the accompanying drawings.

Figure 1:
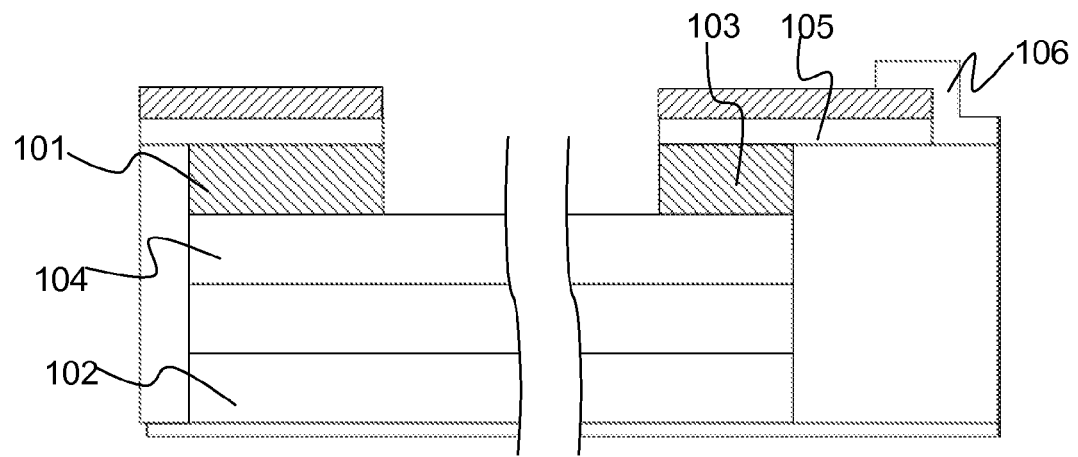
FIG. 1 is a structural schematic view according to an array substrate of a traditional liquid crystal panel.
Figure 2:
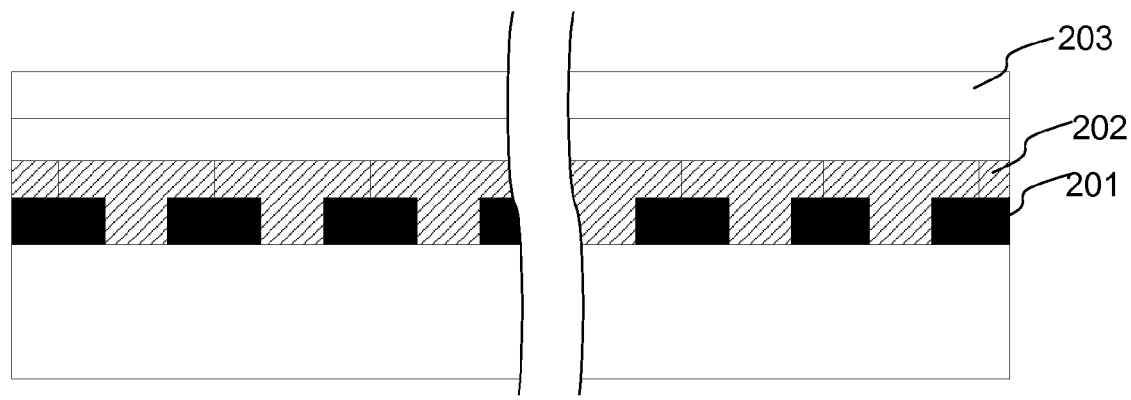
FIG. 2 is a structural schematic view according to a color filter substrate of the traditional liquid crystal panel.
Figure 3:
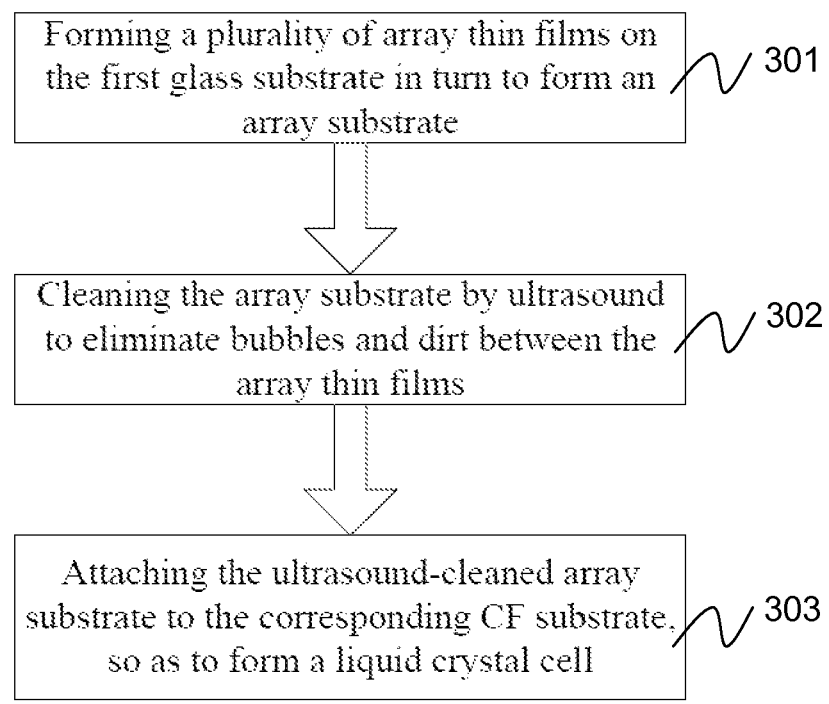
FIG. 3 is a flow chart according to a first preferred embodiment of a method for manufacturing a liquid crystal panel in the present invention.

The present invention relates to a method for manufacturing a liquid crystal panel, as shown in FIG. 3, a flow chart according to a first preferred embodiment of a method for manufacturing a liquid crystal panel in the present invention is illustrated. The method for manufacturing a liquid crystal panel in the present invention starts at a step 301.

In the step 301, a plurality of array thin films are formed on a first glass substrate in turn to form an array substrate, and then a step 302 is executed.

In the step 302, the array substrate is cleaned by ultrasound to eliminate bubbles and dirt between the array thin films, and then a step 303 is executed.

In the step 303, the ultrasound-cleaned array substrate is attached to the corresponding color filter (CF) substrate, so as to form a liquid crystal cell.

The method ends at the step 303.

The flow of the preferred embodiment of the method for manufacturing a liquid crystal panel is described more detailed, as follows.

In the step 301, a plurality of array thin films are formed on the first glass substrate in turn by several processes of photolithographies to form the array substrate, wherein the array substrate comprises a source layer, a gate layer, a drain layer, an insulating layer, an ohmic-contact layer, a metal layer and a first electrode layer. The source layer, gate layer and drain layer form a thin film field effect transistor together; the gate layer connects to a scanning line; the source layer connects to a data line; the drain layer connects to the first electrode layer, so as to realize the object of controlling the output voltage of the first electrode layer through the scanning line and the data line, and control the turning of the liquid crystal molecule in the liquid crystal panel. The ohmic-contact layer, various insulating layers and metal layer ensure the regular operation of each part (such as a thin film field effect transistor) of the array substrate. The first electrode layer can be a transparency conducting metal layer and connect to the drain layer to control the turning of the liquid crystal molecule in the liquid crystal panel. The first electrode layer can be for example indium tin oxide (ITO), tin oxide (TO), indium zinc oxide (IZO) and indium tin zinc oxide (ITZO).

In the step 302, the array substrate formed from the step 301 is cleaned by ultrasound to eliminate bubbles and dirt between the array thin films. The array substrate is first put into an ultrasound cleaner, and then the cleaning solution is provided to fill the ultrasound cleaner until the array substrate is totally covered. The frequency of ultrasound is ranged from 20000 to 1000000 Hz and the power of ultrasound is ranged from 0.1 to 20 watt/mm² to clean the array substrate by ultrasound in the cleaning solution for 20 to 240 seconds. The specific frequency, power and period of ultrasound can be adjusted according to the cleaning situation (for example, the degree the user requires to decrease or minimize bubbles and dirt). If the cleaning result is worse, it is possible to tune up the power of ultrasound or extend the cleaning period; if some bubbles or dirt are not decreased or minimized after several cleanings with higher power, it is possible change the frequency of ultrasound (high-frequency ultrasound (for example higher than 500000 Hz) can efficiently decrease or minimize smaller bubbles or dirt and low-frequency ultrasound (for example lower than 100000 Hz) can better decrease or minimize larger bubbles or dirt). However, the frequency of ultrasound is hard to be lower than 20000 Hz because not only ultrasound lower than 20000 Hz easily form damage to the surface of the array substrate, but also the noise of the ultrasound cleaning machine is too loud to maintain the regular working for the operator.

In the step 303, the ultrasound-cleaned array substrate formed from the step 302 is attached to the corresponding CF substrate, so as to form a liquid crystal cell, and then the liquid crystal cell is assembled to a liquid crystal panel to finally form a liquid crystal panel. In the CF substrate described here, if bubbles and dirt meet the standard regulation, it is not necessary to clean by ultrasound for saving costs; if bubbles and dirt are out of standard regulation and affect the regular operation of the CF substrate, it is further necessary to clean by ultrasound. The specific details are referred to the relevant content in the following second preferred embodiment.

The method ends at the step 303.

The method for manufacturing a liquid crystal panel according to this embodiment leads each array substrate to tighten the combination under the effect of ultrasound, which decreases bubbles and dirt between the array thin films on the array substrate, so as to reduce the effect generated from obstacles such as bubbles affecting the spreading and overlaying of light, so that it increases the uniformity of the display contract of the display panel and improves the display quality of the display panel.

Figure 4:
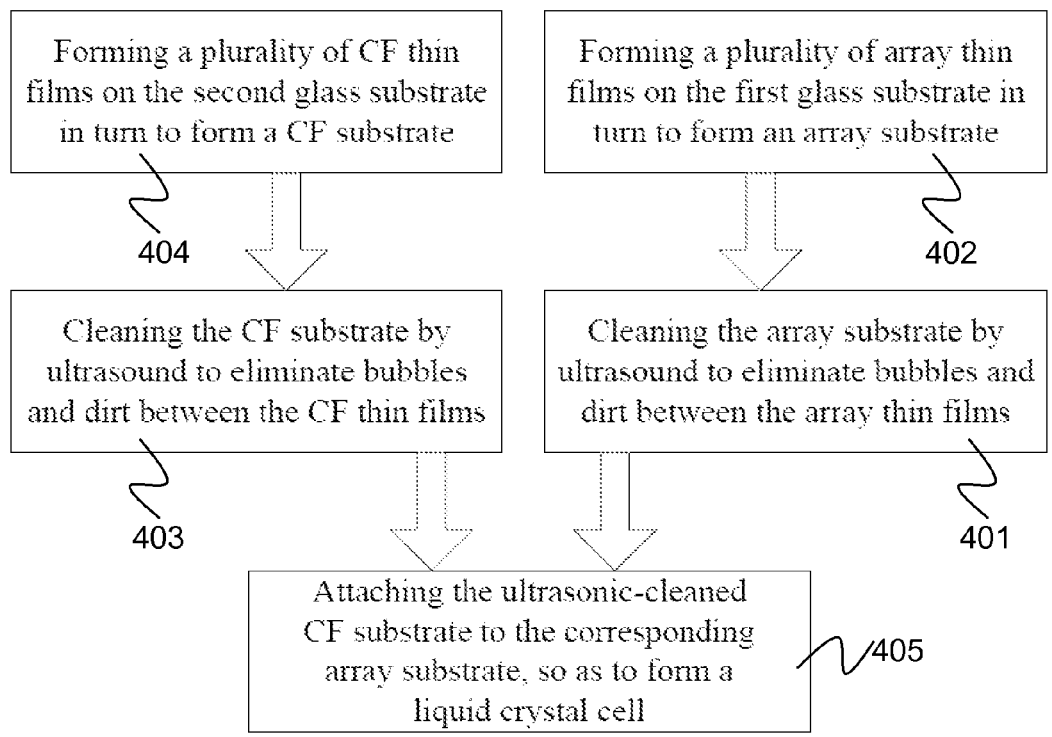
FIG. 4 is a flow chart according to a second preferred embodiment of a method for manufacturing a liquid crystal panel in the present invention.

Please refer to FIG. 4, a flow chart according to the second preferred embodiment of the method for manufacturing a liquid crystal panel in the present invention is illustrated. The method for manufacturing a liquid crystal panel in the present invention begins with steps 401 and 403.

In the step 401, a plurality of array thin films are formed on a first glass substrate in turn to form an array substrate, and then a step 402 is executed.

In the step 402, the array substrate is cleaned by ultrasound to eliminate bubbles and dirt between the array thin films, and then a step 405 is executed.

In the step 403, a plurality of CF thin films are formed on a second glass substrate in turn to form a CF substrate, and then a step 404 is executed.

In the step 404, the CF substrate is cleaned by ultrasound to eliminate bubbles and dirt between the CF thin films, and then the step 405 is executed.

In the step 405, the ultrasound-cleaned CF substrate is attached to the corresponding array substrate, so as to form a liquid crystal cell.

The method ends at the step 405.

The present invention can choose to execute the steps 403 and 404 during, after or before the steps 401 and 402.

The flow of the preferred embodiment of the method for manufacturing a liquid crystal panel is described more detailed, as follows.

The step 401 is the same or similar to the step 301 mentioned above; please refer to the specific description of the step 301.

The step 402 is the same or similar to the step 302 mentioned above; please refer to the specific description of the step 302.

In the step 403, a plurality of CF thin films are formed on the second glass substrate in turn by several processes of photolithographies to form the CF substrate, wherein the CF thin film comprises a black matrix layer, a RGB layer, an overcoat layer and a second electrode layer. The black matrix layer is first formed on the second glass substrate by the process of photolithography, and then the RGB layer (red-green-blue) is formed on the corresponding position of the second glass substrate by the process of photolithography, which leads the black matrix layer to position on the junction of each CF layer so as to prevent light leak and color mixing between each pixel; subsequently the overcoat layer is deposited on the RGB layer, which decreases the height difference of the CF substrate and flattens the surface of the CF substrate; finally, the second electrode layer is produced on the overcoat layer, which can be a transparency conducting metal layer, which can be for example indium tin oxide (ITO), tin oxide (TO), indium zinc oxide (IZO) and indium tin zinc oxide (ITZO).

In the step 404, the CF substrate formed from the step 403 is cleaned by ultrasound to eliminate bubbles and dirt between the CF thin films.

The CF substrate is first put into an ultrasound cleaner, and then the cleaning solution is provided to fill the ultrasound cleaner until the CF substrate is totally covered. The frequency of ultrasound is ranged from 20000 to 1000000 Hz and the power of ultrasound is ranged from 0.1 to 20 watt/$mm^2$ to clean to the CF substrate by ultrasound in the cleaning solution for 20 to 240 seconds. The specific frequency, power and period of ultrasound can be adjusted according to the cleaning situation (for example, the degree the user requires to decrease or minimize bubbles and dirt). If the cleaning result is worse, it is possible to tune up the power of ultrasound or extend the cleaning period; if some bubbles or dirt are not decreased or minimized after several cleanings with higher power, it is possible to change the frequency of ultrasound (high-frequency ultrasound can effectively decrease or minimize smaller bubbles or dirt and low-frequency ultrasound can better decrease or minimize larger bubbles or dirt). However, the frequency of ultrasound is hard to be lower than 20000 Hz because not only the ultrasound lower than 20000 Hz easily form damage to the surface of the array substrate, but the noise of the ultrasound cleaning machine is too loud to maintain the regular working for the operator.

In the step 405, the ultrasound-cleaned array substrate in the step 402 is attached to the ultrasound-cleaned CF substrate, and then the liquid crystal cell is assembled to a liquid crystal panel to finally form a liquid crystal panel.

The method for manufacturing a liquid crystal panel according to this embodiment is based on the former embodiment; meanwhile, it leads each array substrate to tighten the combination under the effect of ultrasound, which decreases bubbles and dirt between the array thin films on the array substrate, thereby it reduces the effect generated from obstacles such as bubbles affecting the spreading and overlaying of light, so that it increases the uniformity of the display contract of the display panel and in turn improves the display quality of the display panel.

Figure 5:
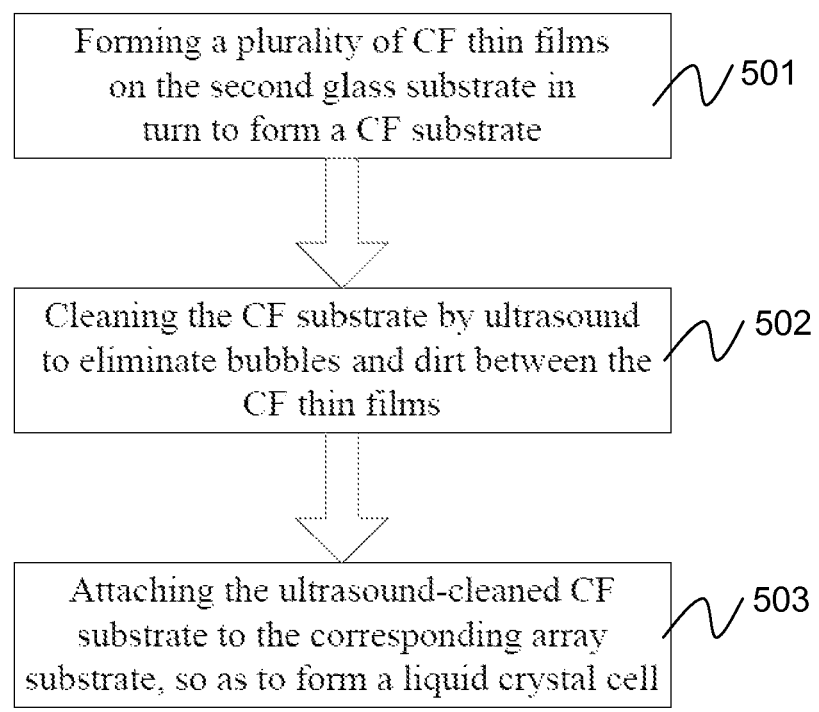
FIG. 5 is a flow chart according to a third preferred embodiment of a method for manufacturing a liquid crystal panel in the present invention.

Please refer to FIG. 5, a flow chart according to the third preferred embodiment of the method for manufacturing a liquid crystal panel in the present invention is illustrated. The method for manufacturing a liquid crystal panel in the present invention begins at a step 501.

In the step 501, a plurality of CF thin films are formed on a second glass substrate in turn to form a CF substrate, and then a step 502 is executed.

In the step 502, the CF substrate is cleaned by ultrasound to eliminate bubbles and dirt between the CF thin films, and then a step 503 is executed.

In the step 503, the ultrasound-cleaned CF substrate is attached to the corresponding array substrate, so as to form a liquid crystal cell. In the array substrate described herein, if bubbles and dirt meet the standard regulation, it is not necessary to clean by ultrasound for saving costs; if bubbles and dirt are out of standard regulation and affect the regular operation of the array substrate, it is further necessary to clean by ultrasound. The specific details are referred to the relevant content of the first preferred embodiment mentioned above.

The method ends at the step 503.

The flow of the method for manufacturing a liquid crystal panel according to the preferred embodiment will be detailed as follows.

The step 501 is the same or similar to the step 403 mentioned above; please refer to the specific description of the step 403.

The step 502 is the same or similar to the step 404 mentioned above; please refer to the specific description of the step 404.

In the step 503, the ultrasound-cleaned CF substrate in the step 502 is attached to the corresponding array substrate, so as to form a liquid crystal cell, and then the liquid crystal cell is assembled to a liquid crystal panel to finally form a liquid crystal panel.

The method for manufacturing a liquid crystal panel according to this embodiment leads each CF substrate to tighten the combination under the effect of ultrasound, which decreases bubbles and dirt between the CF thin films on the CF substrate, thereby it reduces the effect generated from obstacles such as bubbles affecting the spreading and overlaying of light, so that it increases the uniformity of the display contract of the display panel and improves the display quality of the display panel.

According to the above-mentioned description, the method for manufacturing a liquid crystal panel according to the present invention can change surface properties of each of thin films of the array substrate to tighten the combination between the thin films and efficiently decrease or minimize bubbles and dirt effectively between the thin films of the liquid crystal panel, to solve the existing technical problem that bubbles and dirt are easily formed between the thin films on the substrates in the current method for manufacturing a liquid crystal panel.

The present invention has been described with a preferred embodiment thereof and it is understood that many changes and modifications to the described embodiment can be carried out without departing from the scope and the spirit of the invention that is intended to be limited only by the appended claims.

What is claimed is:

1. A method for manufacturing a liquid crystal panel, comprising steps of:
   (A) forming a plurality of array thin films on a first glass substrate in turn to form an array substrate; and
   (B) cleaning the array substrate by ultrasound to eliminate bubbles and dirt between the array thin films.

2. The method for manufacturing the liquid crystal panel according to claim 1, wherein the array thin films comprise a source layer, a gate layer, a drain layer, an insulating layer and a first electrode layer.

3. The method for manufacturing the liquid crystal panel according to claim 1, wherein during the steps (A) and (B), the method for manufacturing the liquid crystal panel further comprises steps of:
   (A1) forming a plurality of color filter (CF) thin films on a second glass substrate in turn to form a CF substrate; and
   (B1) cleaning the CF substrate by ultrasound to eliminate bubbles and dirt between the CF thin films.

4. The method for manufacturing the liquid crystal panel according to claim 3, wherein the CF thin films comprise a black matrix layer, a RGB layer and a second electrode layer.

5. The method for manufacturing the liquid crystal panel according to claim 1, wherein before the steps (A) and (B), the method for manufacturing the liquid crystal panel further comprises steps of:
   (A1) forming a plurality of CF thin films on a second glass substrate in turn to form a CF substrate; and
   (B1) cleaning the CF substrate by ultrasound to eliminate bubbles and dirt between the CF thin films.

6. The method for manufacturing the liquid crystal panel according to claim 5, wherein the CF thin films comprise a black matrix layer, a RGB layer and a second electrode layer.

7. The method for manufacturing the liquid crystal panel according to claim 1, wherein after the steps (A) and (B), the method for manufacturing the liquid crystal panel further comprises steps of:
   (A1) forming a plurality of CF thin films on a second glass substrate in turn to form a CF substrate; and
   (B1) cleaning the CF substrate by ultrasound to eliminate bubbles and dirt between the CF thin films.

8. The method for manufacturing the liquid crystal panel according to claim 7, wherein the CF thin films comprise a black matrix layer, a RGB layer and a second electrode layer.

9. The method for manufacturing the liquid crystal panel according to claim 1, wherein after the step (B), further comprising a step of:
   (C) attaching the ultrasound-cleaned array substrate to the corresponding CF substrate, so as to form a liquid crystal cell.

10. The method for manufacturing the liquid crystal panel according to claim 1, wherein the frequency of ultrasound is ranged from 20000 Hz to 1000000 Hz; the ultrasound power is ranged from 0.1 watt/mm$^2$ to 20 watt/mm$^2$; the period of ultrasound is ranged from 20 seconds to 240 seconds.

11. A method for manufacturing a liquid crystal panel, comprising steps of:
    (A2) forming a plurality of color filter (CF) thin films on a second glass substrate in turn to form a CF substrate; and
    (B2) cleaning the CF substrate by ultrasound to eliminate bubbles and dirt between the CF thin films.

12. The method for manufacturing the liquid crystal panel according to claim 11, wherein the CF thin films comprise a black matrix layer, a RGB layer and a second electrode layer.

13. The method for manufacturing the liquid crystal panel according to claim 11, wherein after the step (B), further comprising a step of:
    (C2) attaching the ultrasound-cleaned CF substrate to the corresponding array substrate, so as to form a liquid crystal cell.

14. The method for manufacturing the liquid crystal panel according to claim 11, wherein the frequency of ultrasound is ranged from 20000 Hz to 1000000 Hz; the ultrasound power is ranged from 0.1 watt/mm$^2$ to 20 watt/mm$^2$; the period of ultrasound is ranged from 20 seconds to 240 seconds.

* * * * *